July 5, 1955
A. A. WELBORN ET AL
2,712,427
IMPACT TYPE SNAP ACTING SHUT-OFF VALVE
Filed July 22, 1952
3 Sheets-Sheet 1
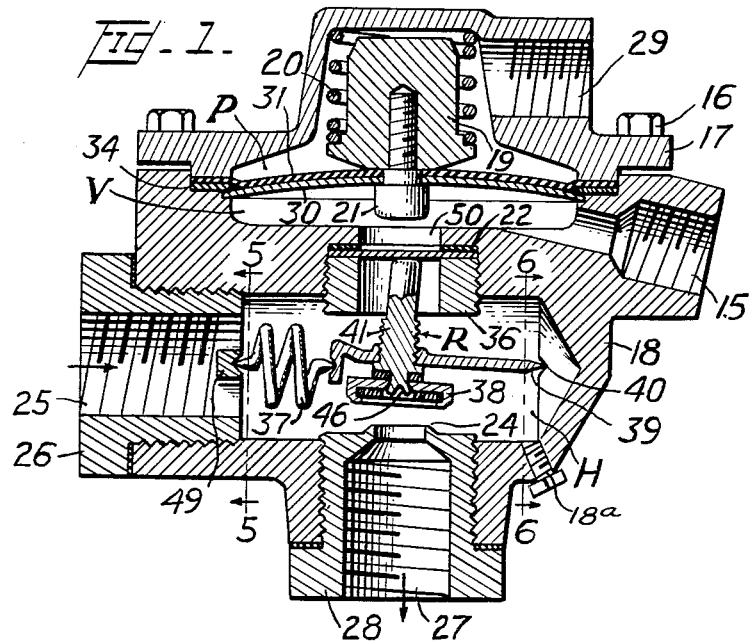
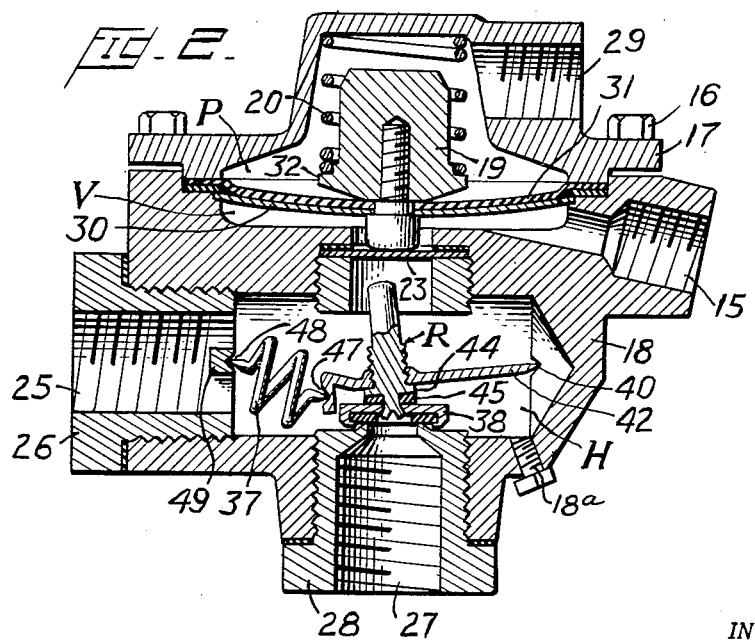
INVENTOR.
Arthur A. Welborn
Robert L. Treuthart

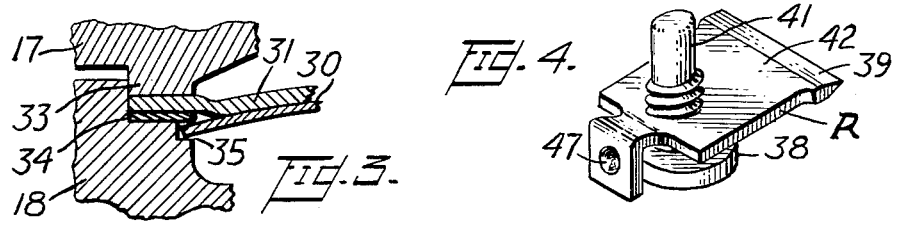
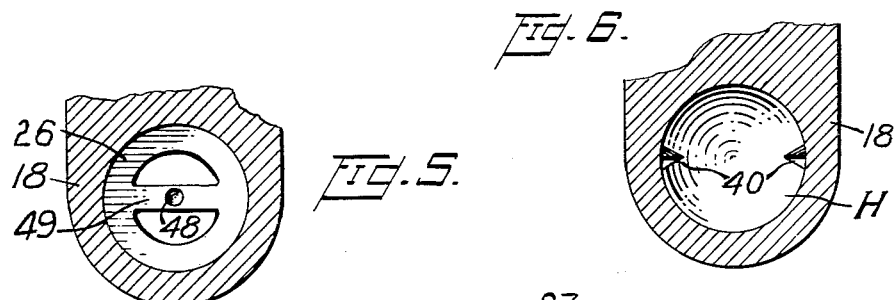
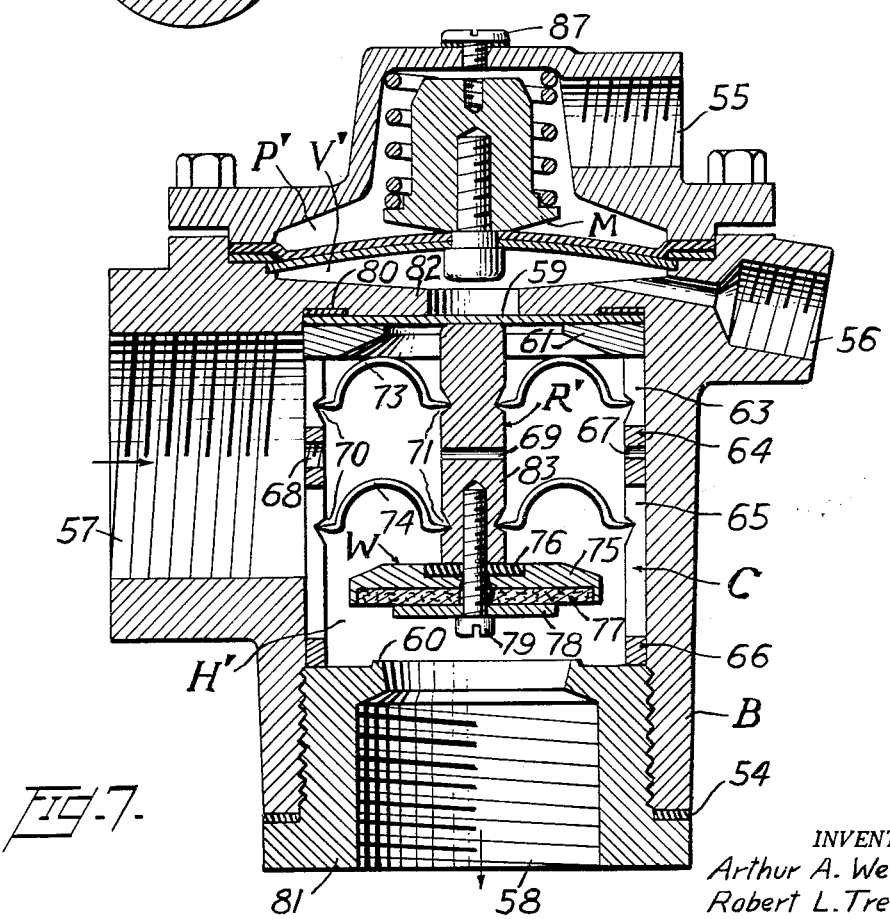

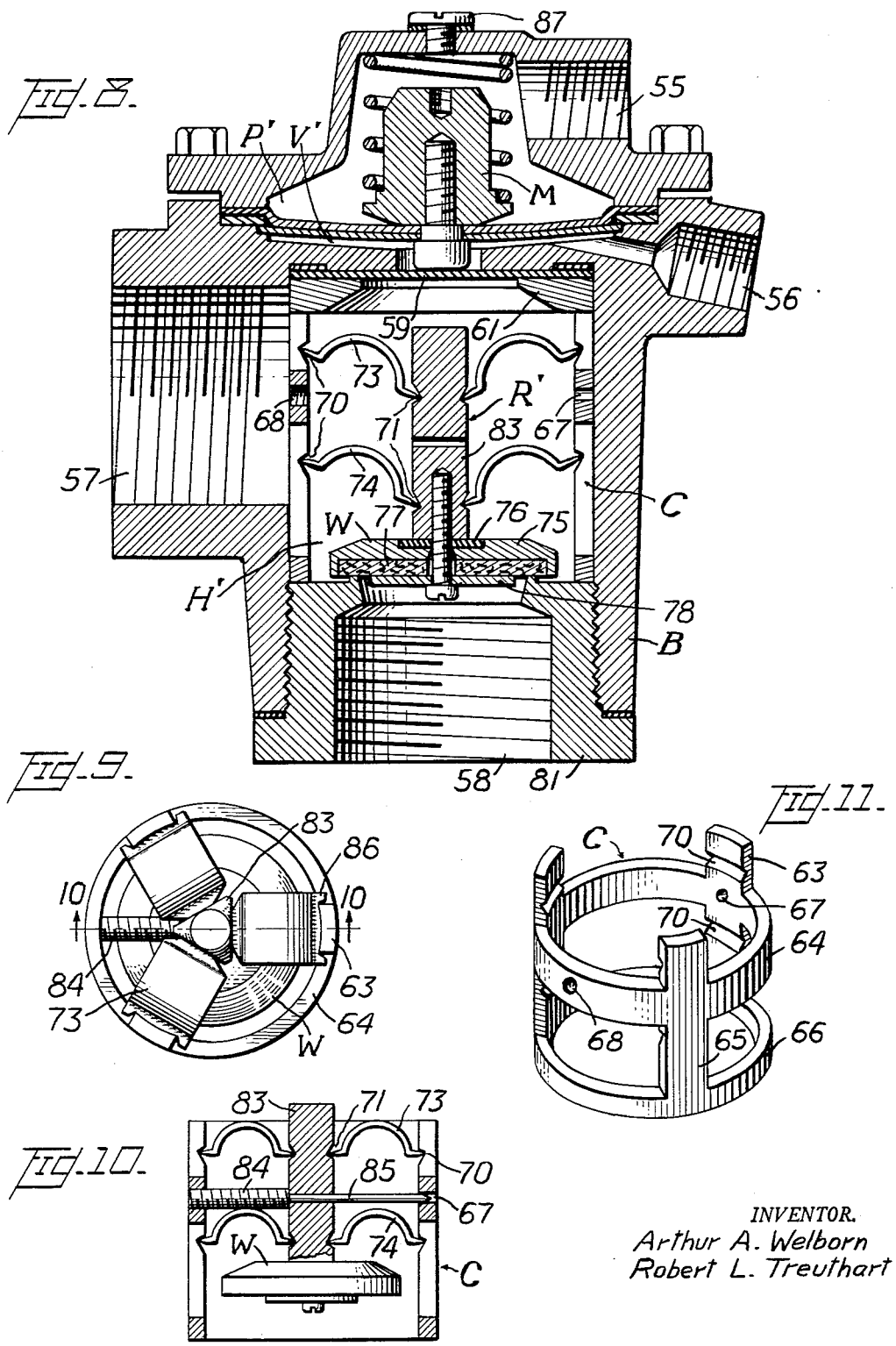

United States Patent Office 2,712,427
Patented July 5, 1955

2,712,427

IMPACT TYPE SNAP ACTING SHUT-OFF VALVE

Arthur A. Welborn, Rogers, and Robert L. Treuthart, Garfield, Ark.

Application July 22, 1952, Serial No. 300,136

12 Claims. (Cl. 251—61)

This invention relates to fluid flow control devices and has particular relation to a mechanism for automatically closing a valve in one channel of fluid flow as the result of an excessive pressure change in a separate body of fluid contained without and near the channel. More particularly, it relates to a device for shutting off a fluid flow in a high pressure duct as the result of a dangerous condition made evident in the form of a rise in pressure of any fluid, including that of reduced pressure from the output of a pressure regulator in the high pressure line itself.

For instance, it is common practice to convey fluid under high pressure through a conduit to a pressure regulator from which fluid of substantially reduced pressure is distributed to various loads or instrumentalities designed to use or consume the fluid at low pressure. The diaphragms of the pressure regulators are usually sensitively constructed, and rupturing sometimes occurs, thus resulting in failure of regulating action such that high pressure fluid is delivered to the load devices. The loads are not designed to withstand high pressure, and consequently the fluid is released with resulting fire, explosion, asphyxiation, or other detrimental effect. Thus, a safety shut-off valve is desired in the conduit supplying the regulator in order that a dangerous pressure rise at the outlet side of the regulator may be communicated back to said valve to shut off the fluid flow therethrough. Of course, this is merely by way of example and is only one of a number of possible applications of the invention.

It is an object of this invention to provide, in effect, mechanical coupling between two fluid systems without the use of a member movable through the walls of the fluid containing channels. For example, as in the above-mentioned service, the regulated reduced pressure is communicated with one fluid system such that a dangerous pressure rise therein will, through the mechanism to be described, result in mechanical impact upon the wall of the high pressure duct such that a responding device therein will move a valve element to shut off the high pressure fluid flow. The mechanism can also be arranged to effect closure of flow should a dangerously low pressure develop without the high pressure duct.

The shut-off valve may be formally described as employing the principle of transfer of momentum. But basically, in the pressure responsive portion potential energy of a spring combination is transformed into kinetic energy of a mass element such that the mass will effect an impact upon a wall of the high pressure duct at a point outside and immediately adjacent a sensitively poised responding element within the duct. The wall suffers an infinitesimal but sudden deflection such that the responding element immediately assumes a substantial part of the kinetic energy of the impacting mass, a portion of the responder's gained energy then being transformed into potential energy of position, the responder then being upset when its potential energy reaches maximum possible value, and the remaining combination of kinetic and potential energy of responding mass serving to accelerate the valve element attached thereto against its seat and forcefully maintain closure therewith so as to shut off the duct fluid flow.

Since there is no member movable through the wall of the duct, there can be no seizure as by abrasive action of foreign matter, and there is no possibility of leakage from the duct. It is clear that, if and when desired, a highly corrosive or dangerous fluid can be controlled in the duct without contaminating the pressure responsive system whatsoever, thus permitting use of a safe and convenient controlling fluid of different origin and nature from the duct fluid. Since there is no passage in the wall, variations of pressure in the high pressure duct cannot be reflected to the pressure responsive mechanism such as to alter its sensitivity or otherwise interfere. Although the shut-off valve contains moving parts, the arrangement is such that there is no friction to interfere with its operation. The invention employs a diaphragm; but unlike so many other diaphragms, this is constructed so as to be failure-proof and permanent. These features permit of an efficient, simple, compact and altogether reliable safety shut-off device.

Two mechanisms embodying the invention are illustrated in the accompanying drawings. It will be understood that the form and arrangement of the several component elements of the devices illustrated may be modified considerably without causing them to depart in function or result from the inventive concept involved and that, therefore, the structures shown are by way of example only.

In the drawings:

Figure 1 is an axial section taken through the entire device, including the valve and the striking means, the valve being illustrated in its unseated position and the striking means in position to deliver an impact;

Figure 2 is a similar view showing, however, the valve seated and the elements of the striking mechanism in the positions which they occupy after this mechanism has functioned to deliver the impact which has resulted in valve closure;

Figure 3 is a fragmentary view showing the construction of the diaphragm and the manner of mounting it, this view pertaining also to the second embodiment of the invention;

Figure 4 is a perspective view illustrating the responder mechanism, with valve;

Figure 5 is a cross sectional view on the line 5—5 of Figure 1;

Figure 6 is a cross sectional view on the line 6—6 of Figure 1;

Figure 7 is an axial section through a large-flow modified form of the invention, showing the duct closing valve in unseated position and the mass element in position to deliver an impact, the impact generating head being here shown substantially identical with that of the first embodiment of the invention, Figure 1;

Figure 8 is a view similar to that of Figure 7, except that the mass element is shown as having already delivered a blow, and the valve is shown seated;

Figure 9 is a full view, taken from above, of the second form of responding mechanism and valve, this view showing more clearly the spring members, and illustrating the integral nature of the responder as a sub-assembly in itself;

Figure 10 is a cross sectional view on the line 10—10 of Figure 9, illustrating the use of a screw member to facilitate assembly and to maintain the responder as an integral unit until installed within the casing of the invention, two of the spring members being shown which would not actually appear in this sectional view;

Figure 11 is a perspective view showing more clearly the housing of the responder device.

In the first form of the invention disclosed, the fluid pressure responsive mechanism is pressurized through the connection 29 over the region generally indicated at P, and is separated from the high pressure duct indicated generally at H by the intermediate region V vented to the atmosphere or other reference pressure at 15, or perhaps via an extended tube connected at 15. Bolts or screws, one of which is indicated at 16, serve to join the cover piece 17 to the body section 18, clamping between themselves in fluid-tight manner the pressure responsive two-ply diaphragm 30, 31. The impact member consisting of mass 19 together with post 21 is mounted on the diaphragm 30, 31 and arranged to strike the wall or partition 23 such as to effect by transfer of momentum the release or upsetting of valve and responder device, generally indicated at R, this in turn effecting closure with the valve seat 24 so as to shut off high pressure fluid flow through the duct H between the inlet 25 in fitting 26 and the outlet 27 in fitting 28, both fittings being interiorly threaded to be attachable to conduit or pipe line.

Housed within the cover 17 is the impact generating head including a snap-spring diaphragm 30 preloaded downwardly (Figure 1) by the compressed helical spring 20 and surmounted by the impacting mass 19, the diaphragm being pressurized via the connection 29 and associated conduit (not shown) extending distantly to some source of controlling pressure, such that when this pressure rises to a critical value the diaphragm 30, upwardly opposing and withstanding the downward force of spring 20 compressed between the coverd 17 and the mass shoulder 32, is overcome by the pressure applied over the region P so that it no longer can support said spring, the diaphragm now snapping downwardly so that its own spring action reverses and assists the spring 20 in accelerating mass 19 toward and against partition 23. It is understood that other forms of spring, such as a space saving cantilever beam arrangement, can be employed in place of the spring 20 and placed either above or below the diaphragm, yet such as to load it downwardly toward the space V.

The snap-spring diaphragm 30 is a concavo-convex layer of resilient material, preferably spring temper sheet metal, although some non-metals are usable. Alternatively (and not shown), the diaphragm could have a large central aperture to loosely receive, support, and be bridged by the impact mass 19, the manner of mounting the diaphragm at its outer margin being unchanged. Either form of diaphragm is a warped surface having two stable positions, one upwardly as in Figure 1, and the other downwardly as in Figure 2, although actually the diaphragm is not shown completely displaced in either view, its upward deflection being somewhat retarded by the downward loading force of spring 20, and its downward deflection being slightly retarded by the upward reaction of the displacement limiting wall or partition 23. The diaphragm is illustrated as a two-ply device, the spring layer 30 being covered with a sealing layer or membrane 31 of some flexible fluid-tight material such as, for example, neoprene.

The cover 17 (Figure 3) is coaxially aligned with the body 18 by the downwardly projecting clamping flange 33 of cover telescoping into the cylindrical cavity formed in the body, the margin of the membrane 31 extending outwardly from the spring layer 30 so as to be clamped, together with the intermediate fiber or other ring 34, between cover and body in fluid sealing manner such as to prevent leakage from the region P, and to seal off the space V. Within said body cavity, and in coaxial alignment therewith, is a recess 35 loosely receiving the periphery of the snap-spring member 30, the spring thus being supported and aligned radially by the recess and axially between the recess and the fiber ring 34, the ring serving to protect the membrane from the spring edge and to more firmly enclose the spring than would the membrane itself. (The ring 34 may be optional, depending on the membrane material.) Centrally of the diaphragm, the aligned inner margins of the layers 30 and 31 are clamped between the mass 19 and the screw post 21 such as to carry and support the impact mass, the clamping pressure on the membrane serving to prevent leakage from the region P, and the clamping faces of the post 21 and the mass 19 being kept small to provide a substantial clamping pressure and yet without exerting leverage on the snap-spring such as to hinder its snap motion deflection.

Ring 36 within the duct H and threadedly engaged with the body 18 clamps the partition 23, preferably of spring-temper metal, against the body 18 so as to close the body aperture 50, an intermediate gasket 22 serving to prevent fluid leakage from region H to the space V. Upon impact of mass 19, 21 with the partition, the responding mass R partakes of momentum so as to upset the snap-motion spring 37 which in turn closes and maintains the valve 38 against seat 24, thus shutting off fluid flow through duct H.

The responder possesses a lever 42, one end having the form of a straight knife edge 39, the opposite end having a central tab bent substantially at right angles to the plane of the lever and having an outwardly facing conical punched cavity 47 (Figure 4). Threadedly engaged through the lever 42 and protruding upwardly at right angles thereto is a spindle 41 stopped against the lever by contact of the spindle shoulder 44 therewith. At the extreme bottom of the spindle 41 is an end slotted cylindrical extension 46 to receive first the resilient and deformable gasket 45 and next the valve 38 having within itself a gasket to effect a seal with the valve seat 24, the latter gasket being centrally apertured to expose the slotted spindle. By way of accounting for the manner of construction, the combination 41, 45, 38 is separately assembled, the slotted end of the spindle expanded to prevent removal of the valve, the lever 42 entered into the inlet end of the duct H (fitting 26 removed), and said combination then entered into the outlet end of the duct (fitting 28 absent) and screwed into the lever, the slotted spindle end serving now to receive the screwdriver.

Opposite the inlet end of the duct H where the cylindrical section merges with the conical dead end, are two wedge-shaped punched cavities 40 (Figure 6) lying at opposite ends of a diameter of the duct, the peak of the depressions forming a straight line colinear with said diameter. The responder knife edge 39 is pivotally received by the indentations 40 and is held therein by the force of snap-motion spring 37 compressed between and pivoted within conical cavity 47 in 42 and a conical cavity 48 punched centrally of the cross bar 49 (Figure 5) on inlet fitting 26. The responder R is thus mounted for frictionless movement as a toggle. The spring 37 is preferably helical, with the ends brought centrally and then aligned outwardly along the spring axis, each end being ground to a generally conical form.

In Figure 1 the pivot point 47 is shown very slightly above the plane formed by the indentations 40—40 and the pivot point 48 on fitting 26, the spring 37 thus urging the spindle 41 gently but firmly upward against the duct wall section 23. Upon partaking of momentum from the impact generating device, the responder R moves downwardly so as to at first slightly shorten and further compress the spring 37 until the pivot point 47 reaches the plane determined by points 40—40—48, beyond which position the spring snaps downwardly, expanding until the valve 38 closes upon seat 24, whereat it is forcefully retained until manually reset.

Since the valve approaches the seat along an arc of a circle rather than along a straight line path, it is desirable to pivotally mount the valve 38 on the responder spindle 41 such as to assure perfect closure with seat 24, this pivoting motion being evident from an inspection of Figures 1 and 2. Valve 38 is rather loosely retained by the expanded spindle end 46 such as to permit tilting of the valve, the tilting being resiliently opposed by the deformable material 45 which serves also as a gasket to prevent leakage at the loose central mounting of the valve, and where said gasket is still more firmly clamped due to force of spring 37 after the valve is shut.

Resetting of the responder R is achieved preferably by providing the side wall 18 of the duct H with a removable screw plug 18a such as to permit insertion of a suitable tool with which the responder mechanism can be lifted or levered upward until it rests against the partition 23. To reset the impact generating head, a choice of methods is available. The snap-spring diaphragm is readily removable for reversal of deflection, or the vent tube (if any) connected at 15 can readily be removed and a screwdriver or similar tool inserted through port 15 to lever the diaphragm upwardly. Alternatively, the cover can be provided with a screw plug to permit access to the impact device, as will be shown in a modified form of the invention.

A modified form of the invention is illustrated in Figures 7 through 11, wherein a very compact structure is had as compared with the capacity of flow it can control; although this can of course be made for small flow usage, it is the preferred form for large, high pressure flows. The impact generating head is like that employed in the first form of the invention, above described. The responder device is substantially different in construction, though the same in principle, and is adapted for convenient assembly. It is to be observed that in either form of the invention, an alteration in the construction of the responding device and valve is possible without altering the impact generating head, and conversely, different constructions of impact head are usable without altering the responder and valve mechanism.

As before, when controlling fluid pressure, communicated with the device through connection 55 to pressurize the pressure responsive system over the region P', rises to a critical value with respect to the atmospheric or other reference pressure communicated through connection 56 to the space V', the mass M will be given momentum, a good part of which will be transferred through the partition 59 to the responder, indicated generally at R', so as to shut the valve against the seat 60, thus shutting off fluid flow entering the duct H' at 57 and leaving at connection 58 in fitting 81.

Within the duct H' and coaxially with the main axis of the invention extending through the impact generating head and the bottom outlet connection 58, and in order of placement from the top downward (Figure 7), are found the gasket 80, establishing a fluid seal between the duct H' and the space V', the partition 59, partition clamping ring 61, the responder housing or cage indicated generally at C, and the fitting 81 sealed to the body B with the gasket 54, the items in duct H' being held in place between the wall 82 of body B and said fitting 81 threadedly engaged with B at the lowermost end of duct.

Compressed radially between the cage C and the responder shaft 83 are a series of spring blades bowed more or less in semicylindrical fashion, and pivotally mounted at either end, such as to urge the shaft gently but firmly upward against the partition 59, as in Figure 7, or strongly downwardly, as in Figure 8. The plan view of the spring is shown in Figure 9, wherein they are observed to have small ears 86 to prevent them from sliding sideways out of the grooves 70, there being no tendency to slide within the shaft grooves 71. The springs are arranged in an upper layer or deck 73, and also in a lower deck 74, such as to support the shaft 83, with valve W, centrally of the duct H' and align it axially therewith at all times. Sharpened ends of springs 73 and 74 form straight parallel knife edges such as to be frictionlessly pivotally supported outwardly within cage slots 70 and centrally within shaft slots 71, the cage slots having a gradual approach from below and an abrupt approach from above, the shaft slots being sloped in reverse manner, thus freely clearing the springs as they snap from one position to the other, and also better supporting them against slippage upwardly or downwardly out of the slots. The cage slots 70 are more clearly observed in Figure 11, the cage itself being shown in preferred shape, although considerable variation in design is, of course, permissible in order to afford manufacturing convenience. The shaft 83 is preferably of triangular form, as is observed in the full view of Figure 9, looking downward on the complete responder and valve assembly R'—W from above. The cage C is observed to consist of three legs (the preferred number) joined by an upper ring or hoop 64 and a lower hoop 66, the lower portion of the legs being indicated at 65, and the upper portion at 63, the upper deck of spring slots 70 occurring in the upper legs 63 and the lower deck of slots 70 existing in the lower legs 65. The cage is rotationally aligned within the casing B such that two cage legs span the fluid inlet port 57, thus minimizing the obstruction of fluid flow, the flow thus passing inwardly above and below hoop 64, and downwardly past valve W, and the cage stiffening hoop 66 being spaced well away from the opened valve W (Figure 7) such as to avoid constriction of flow therearound.

As an assembly aid, the responder and valve combination R'—W is constructed as a separate unit, as is illustrated in the full view of Figure 9 and the sectional view of Figure 10, the two springs shown to the left of Figure 10 not actually assuming the illustrated positions. First, an assembly screw having a threaded portion 84 and a smooth reduced portion 85 is entered into the threaded hole 68 in the cage C, the reduced portion then being entered through the bore 69 in shaft 83, and finally into the port 67 diametrically opposite the threaded entry 68 in cage. The shoulder at the end of the threaded portion 84 serves as a stop to limit the leftward motion (Figure 10) of shaft 83. The upper and lower springs 73 and 74 are next placed at the right of the shaft (Figure 10), which is supported centrally of the cage by said stop. The remainder of the springs are installed, the valve W added, and the responder-valve assembly R'—W is then complete, and can be installed within the duct H'. After the threaded fitting 81 is in place, the assembly screw 84, 85 is removed through the fluid flow inlet connection 57, the assembly then being movable either upwardly against the partition 59 or downwardly against the valve seat 60 without losing the springs, as the deflection is limited each way to a safe value so that the springs can never fully relax and fall out. The method of assembly is outlined only because of the very close relationship between the design of the components and the manner of assembly thereof within the casing B.

In the event the springs 73, 74 are not all identical or of quite the same strength, a slight departure of shaft 83 and valve W from axial alignment within the duct H' may occur. To compensate for this possibility, the valve W is pivotally supported upon the shaft 83, the valve body 75 carrying an upper gasket 76 and a lower gasket 77, the latter sealing with the seat 60 and held in place by a washer 78, and the assembly being attached to shaft 83 by screw 79. Thus, when tilting of the valve is necessary to effect perfect sealing, the gasket 76 compressed between 75 and 83 will be still further compressed on one side and somewhat relaxed on the other, but such as to maintain a fluid seal at what would otherwise be a leakage path along the screw 79 and through the valve body 75. The central screw clearance hole in 75 is enlarged downwardly so as to permit valve tilting without obstruction by the screw shaft; the central aperture in gasket 77 is either enlarged for extra screw clearance or is made readily deformable.

In Figure 7 the responder is shown in the sensitive, cocked position, the central pivot places 71 being very slightly elevated above the outer pivot places 70. Upon striking of the partition 59 by the impact mechanism, the combination R'—W will partake of a substantial momentum downwardly so as to upset the cocked springs 73, 74 by lowering the pivot places 71 below the level of grooves 70, at which time the springs will expand so as to further speed the valve toward the seat 60 and forcefully maintain closure therewith to shut off the fluid flow leaving the duct H' at pipe connection 58, the final position of the components being illustrated in Figure 8.

The responder device is again accessible for resetting via the removal of screw plug (not shown) in duct casing. And the impact mechanism is capable of being reset by the removal of screw plug 87 and the insertion of threaded handle or screw through the passage thus obtained and into a threaded hole in mass M to lift and reverse the diaphragm.

As thus far described, the construction has been arranged for service with what might be called a "moderate" controlling critical pressure. However, in either form of the invention, if the controlling pressure can be allowed to rise to a substantially high critical value before actuating the pressure responsive mechanism, the helical spring preloading of the snap-spring diaphragm will be unnecessary, the fluid force taking its place; and the spring compressed between the housing of the pressure responsive mechanism and the impacting mass carried upon the diaphragm can be eliminated, thus simplifying the structure.

As hereinbefore described, the pressure responsive mechanism is arranged to respond when the controlling pressure rises from a lower value to the critical value. But by reversing the vent and control pressure connections, and by increasing the loading force of the helical spring upon the snap-spring diaphragm, the impact generating device can be caused to deliver an impact when the controlling pressure decreases from a higher value to a critically low value. For example, if the controlling pressure is greater than atmospheric pressure or whatever pressure is used as reference value above the diaphragm (Figure 1 or 7), the helical spring will have to preload the diaphragm so as to snap it downward in the absence of sufficiently high control pressure therebelow. Thus, when the control pressure decreases from a normal to a critically low value, this spring load will become sufficiently unopposed to cause the diaphragm to snap downwardly such that the striking mass can deliver an impact to result in valve closure. For such service therefore, the fluid connections to ports 15 and 29 (Figure 1) will require reversal, and the spring 20 will need to be strengthened (or the diaphragm weakened); and similarly for the second form of the invention (Figure 7), where the connections at 55 and 56 will require switching.

The invention hereinbefore described and illustrated is anticipated in principle in our copending application entitled "Fluid Flow Control Devices," filed March 4, 1952, and having Serial Number 274,736. Accordingly, the complete combination of impact generating mechanism with impact responding mechanism will not be considered in the following claims, but these mechanisms shall be treated of separately in their new and improved forms.

Having thus described the invention, what is claimed as new and desired to be secured by Letters Patent is:

1. In a fluid flow control device of the class described, in combmination, a casing having a duct for the transmission of fluid and having a valve seat therein, a fluid-tight deflectable partition permanently sealing an aperture in the duct casing, a driven element and a valve within the duct disposed generally between the said seat and said partition, the valve being mounted on and carried by the said element, the element being pivotally supported within sockets having a fixed relationship with the said casing, a spring compressed between the pivotally supported driven element and another socket fixedly mounted within the casing and arranged to urge the said element either toward and against or away from said partition, the valve thus being moved respectively, either away from or toward and against the said valve seat, the partition upon an impact from without the duct serving to transfer the momentum therethrough to the driven element, the element thus endowed with momentum moving away from the partition and against the force of said spring, further compressing the spring until an unstable position is reached and passed, the spring thereafter expanding so as to urge said element in the direction of the valve seat, the valve carried with the element then being closed upon the seat to shut off fluid flow through the duct, the said driven element consisting of a lever pivoted at one end in said element sockets and at the other end pivotally engaged with said spring, a spindle passing through the lever, the valve mounted on one end of the spindle, and the other end of the spindle being capable of engagement with said partition.

2. In a fluid flow control device of the class described, in combination, a casing having a duct for the transmission of fluid and having a valve seat therein, a fluid-tight deflectable partition permanently sealing an aperture in the duct casing, a driven element and a valve within the duct disposed generally between the said seat and said partition, the valve being mounted on and carried by the said element, the element being pivotally supported within sockets having a fixed relationship with the said casing, a spring compressed between the pivotally supported driven element and another socket fixedly mounted within the casing and arranged to urge the said element either toward and against or away from said partition, the valve thus being moved respectively, either away from or toward and against the said valve seat, the partition upon an impact from without the duct serving to transfer the momentum therethrough to the driven element, the element thus endowed with momentum moving away from the partition and against the force of said spring, further compressing the spring until an unstable position is reached and passed, the spring thereafter expanding so as to urge said element in the direction of the valve seat, the valve carried with the element then being closed upon the seat to shut off fluid flow through the duct, the said spring being of substantially helical form with the ends brought centrally and aligned outwardly along the spring axis, each end being pointed, one end pivotally engaged with a conical socket in an end portion of said driven element, and the spring sockets receiving the other end being formed in an insert member engaged within the casing of the duct.

3. In a fluid flow control device of the class described, in combination, a duct for the transmission of fluid and having a valve seat therein, a fluid-tight deflectable partition permanently sealing an aperture in the duct casing, a driven element and a valve within the duct and disposed generally between the seat and said partition, the valve being mounted on and carried by the element, the element being pivotally and reciprocatingly suspended centrally of a system of compressed springs, outwardly of the system the springs pivotally engaged with an enclosing retaining structure, said structure having fixed relationship with the surrounding duct casing, the element arranged to be urged by the springs either toward and against or away from said partition, the valve thus being carried, respectively, either away from or toward and against the valve seat, the partition upon an impact from without the duct serving to transfer momentum therethrough to the driven element, the element thus endowed with momentum moving away from the partition and against the action of said spring system, further compressing the springs until an unstable position is reached and passed through, the spring system thereafter expanding so as to urge and guide the element in the direction of the valve seat, the valve carried with the element then closing upon the seat to shut off duct fluid flow.

4. The combination set forth in claim 3 wherein said driven element consists of a polygonal spindle slotted peripherally, the slots pivotally receiving one end of each of said compressed springs which are arranged to reciprocatingly support, align, and move the spindle, said valve mounted upon one end of the spindle, and the other end of the spindle capable of engagement with said partition.

5. The combination set forth in claim 3 wherein said spring system consists of a plurality of generally semi-cylindrical spring blades, the ends of the blades bent outward as along a diameter extended of the semicylinder, and these blade extremities terminating in parallel knife edges, the blades being compressed between and pivotally bearing within slots in said driven element and slots in said retaining structure.

6. The combination set forth in claim 3 wherein said driven element is in frictionless manner reciprocatingly supported, aligned, and moved by at least two compressed spring arrays spaced a distance apart axially of the element.

7. In a fluid flow control device having a fluid conveying duct with a valve seat, a valve mounted upon a spindle, the spindle supported and aligned and reciprocatingly movable by springs disposed about the spindle and compressed between the spindle and a retaining structure, each spring pivotally bearing at opposite ends in slots in both the spindle and structure respectively, the said structure surrounding the spindle and coaxially disposed with respect thereto, said slots being positioned in said spindle and structure respectively, in substantially the same plane coaxially of the spindle when the said valve is in its open position the springs either opposing one another that the valve may be held away from the seat or acting at an angle to one another that the valve carried upon the spindle may be urged in rectilinear motion toward and against the seat to shut off duct fluid flow.

8. The combination set forth in claim 7 wherein the spindle and retaining structure are capable of being locked with respect to each other by means of a removable screw shaft entered through a hole in one side of the retaining structure, through a bore in the spindle, and into a hole in the other side of structure, this shaft passing at right angles to the common axis of the spindle and retaining structure, and the resulting system of retaining structure, spindle, said compressed springs and valve being thus capable of existing temporarily as a unit separate from said fluid conveying duct for the purpose of facilitating the assembly of all components concerned, and said screw shaft being removed after said unit is enclosed within said duct.

9. In a fluid flow control device of the class described, in combination, a duct for the transmission of fluid and having a valve and valve seat therein, the valve closing upon the seat so as to shut off fluid flow therethrough as the result of an impact delivered from without the duct upon a fluid-tight deflectable wall portion thereof, an intermediate fluid receiving chamber without the duct and having the deflectable wall portion in common therewith, an outer fluid receiving chamber adjacent the intermediate chamber and on the side thereof opposite the duct, the two chambers alternately communicable with a controlling fluid pressure and a reference fluid pressure, a fluid pressure responsive movable wall in common with the two chambers, this wall constructed to have a snap-action deflection either toward or away from said deflectable duct portion, a stressed spring mounted with respect to the snap-action wall and the duct casing and the two chambers so as to load said snap-wall in the direction of said deflectable duct portion, a sufficient change in fluid pressure differential across the snap-wall and between said chambers resulting in deflection of the wall past its snap-over position, the wall thus reversing its action in the direction of said duct portion, an impacting mass carried by the snap-wall thus being accelerated toward and against the deflectable duct portion to effect transfer of momentum therethrough that said valve may close with said seat.

10. The combination as set forth in claim 9 wherein said pressure responsive wall consists of a generally concavo-convex layer capable of snap-over deflection, the layer being spring temper sheet material, this layer covered with a sealing membrane to serve as a gasket means at the outer margin of said layer and also at the inner margin thereof where the impacting mass is mounted, the layer itself being loosely retained and supported peripherally within a recess in the chamber wall.

11. The combination set forth in claim 9 wherein said pressure responsive wall comprises a mass loaded snap-over diaphragm.

12. The combination set forth in claim 9 wherein said spring is of helical form and is disposed within said outer fluid receiving chamber and compressed between the chamber housing and the impacting mass so as to load said snap-wall in the direction of said deflectable duct portion.

References Cited in the file of this patent

UNITED STATES PATENTS

| | | |
|---|---|---|
| 1,067,613 | Lane | July 15, 1913 |
| 1,681,041 | Kimbrough | Aug. 14, 1928 |
| 1,683,213 | Le Pas | Sept. 4, 1928 |
| 2,163,436 | Raymon | June 20, 1939 |
| 2,426,364 | Massecar | Aug. 26, 1947 |
| 2,553,253 | Hays | May 15, 1951 |
| 2,573,623 | Stover | Oct. 30, 1951 |